US012329703B2

(12) United States Patent
Lafleche et al.

(10) Patent No.: US 12,329,703 B2
(45) **Date of Patent: *Jun. 17, 2025**

(54) SYSTEM AND METHODS FOR SUPPORTING AND POSITIONING A PERSON

(71) Applicant: Stryker Corporation, Kalamazoo, MI (US)

(72) Inventors: Patrick Lafleche, Kalamazoo, MI (US); Justin Jon Raymond, Jackson, MI (US)

(73) Assignee: Stryker Corporation, Portage, MI (US)

( * ) Notice: Subject to any disclaimer, the term of this patent is extended or adjusted under 35 U.S.C. 154(b) by 435 days.

This patent is subject to a terminal disclaimer.

(21) Appl. No.: 17/509,466

(22) Filed: Oct. 25, 2021

(65) Prior Publication Data

US 2022/0040019 A1 Feb. 10, 2022

Related U.S. Application Data

(63) Continuation of application No. 16/265,208, filed on Feb. 1, 2019, now Pat. No. 11,173,087.

(60) Provisional application No. 62/625,018, filed on Feb. 1, 2018.

(51) Int. Cl.
*A61G 7/10* (2006.01)

(52) U.S. Cl.
CPC ......... *A61G 7/1021* (2013.01); *A61G 7/1059* (2013.01); *A61G 2203/10* (2013.01)

(58) Field of Classification Search
None
See application file for complete search history.

(56) References Cited

U.S. PATENT DOCUMENTS

| | | | |
|---|---|---|---|
| 3,745,998 | A | 7/1973 | Rose |
| 3,762,404 | A | 10/1973 | Sakita |
| 3,949,438 | A | 4/1976 | Scales |
| 4,234,982 | A | 11/1980 | Bez et al. |
| 5,556,169 | A | 9/1996 | Parrish et al. |
| 5,826,583 | A | 10/1998 | Wood |
| 5,966,763 | A | 10/1999 | Thomas et al. |

(Continued)

FOREIGN PATENT DOCUMENTS

WO WO-2007128967 A2 * 11/2007 ........... A47C 20/025

*Primary Examiner* — Adam C Ortiz
(74) *Attorney, Agent, or Firm* — Howard & Howard Attorneys PLLC

(57) ABSTRACT

A system for supporting and positioning a person. A flexible cover layer defines a support surface for the person, and a formable layer is coupled to the flexible cover layer. The formable layer includes a sealed bladder adapted to be in fluid communication with a vacuum source, and particles disposed within the sealed bladder. The system is operable in a first configuration in the absence of the vacuum, and a second configuration in the presence of the vacuum. In the first configuration, the particles are substantially movable relative to one another such that a contour may be provided to the support surface. In the second configuration, substantially immovable relative to provide rigidity to the formable layer to maintain the contour. A controller coupled to sensors may control the vacuum source to move said system between the first and second configurations. Methods of supporting and positioning the person are also disclosed.

19 Claims, 9 Drawing Sheets

(56) References Cited

U.S. PATENT DOCUMENTS

| | | | |
|---|---|---|---|
| 6,308,353 B1 | 10/2001 | Van Steenburg | |
| 6,890,292 B2 | 5/2005 | Kochamba et al. | |
| 6,918,393 B2 | 7/2005 | Rugfelt et al. | |
| 8,671,479 B2 | 3/2014 | Huttner et al. | |
| 9,622,829 B2 | 4/2017 | Vogele | |
| 10,130,537 B2 | 11/2018 | Finch, Jr. et al. | |
| 10,206,843 B2 | 2/2019 | Hiebert | |
| 10,827,844 B2 | 11/2020 | McKnight et al. | |
| 11,173,087 B2 * | 11/2021 | Lafleche | A61G 7/001 |
| 11,737,914 B2 | 8/2023 | Taylor et al. | |
| 2003/0226206 A1 | 12/2003 | Ben-Levi | |
| 2004/0226103 A1 | 11/2004 | Reger et al. | |
| 2006/0123552 A1 | 6/2006 | Ben-Levi | |
| 2007/0143928 A1 | 6/2007 | Biggie et al. | |
| 2009/0205138 A1 | 8/2009 | Chen et al. | |
| 2014/0143956 A1 | 5/2014 | Mohr | |
| 2014/0157515 A1 | 6/2014 | Manson | |
| 2015/0128341 A1 | 5/2015 | Kuiper et al. | |
| 2015/0135444 A1 * | 5/2015 | Spahn | A61G 7/05769<br>5/655.3 |
| 2016/0367419 A1 | 12/2016 | Bhai et al. | |
| 2017/0095388 A1 | 4/2017 | Hiebert | |
| 2017/0224126 A1 | 8/2017 | O'Connell, Jr. | |
| 2017/0245656 A1 | 8/2017 | Ribble et al. | |
| 2018/0160980 A1 | 6/2018 | Balderama Arenas et al. | |
| 2018/0280219 A1 | 10/2018 | Garrett et al. | |

* cited by examiner

SYSTEM AND METHODS FOR SUPPORTING AND POSITIONING A PERSON

CROSS-REFERENCE TO RELATED APPLICATIONS

This application is a Continuation of U.S. patent application Ser. No. 16/265,208, filed on Feb. 1, 2019, which claims priority to and the benefit of U.S. Provisional Patent Application No. 62/625,018, filed on Feb. 1, 2018, the disclosures of each of which are hereby incorporated by reference in their entirety.

BACKGROUND

Whether for comfort or to facilitate treatment, devices exist that maintain a desired position of at least a portion of a person supported on a support apparatus, such as a bed, seat, chair, hospital bed, stretcher, cot, trolley, gurney, wheelchair, and the like. The devices, often termed "patient positioners," are configured to be nestled about a patient, for example, the patient's torso or lower extremities to maintain a clinically suitable position of the same. Perhaps the most basic patient positioner is a preformed support (e.g., a wedge-like member) generally shaped to accommodate certain anatomy of the patient with the patient supported on a mattress. The predefined shape of the preformed support, however, is not necessarily the desired shape for a particular application or patient. Further, preformed supports provided with some flexibility or resiliency do not adequately maintain the predefined shape over time.

Further known patient positioners utilize bladders either inflatable with a fluid or deflatable under the influence of a vacuum. The bladders are designed to conform to the anatomy of the patient. For examples utilizing a vacuum, the Vac-Pac® Surgical Positioning System by Natus Medical Corp. (Robert-Koch-Str. 1, 52152 Planegg, Germany) and the Vac-Lok™ system from CIVCO Radiotherapy (Coralville, Iowa) include a bladder that is removably positioned atop the support surface of the support apparatus, after which the bladder is coupled to a vacuum source to provide the vacuum. The aforementioned systems are cumbersome to install and operate. For example, the aforementioned systems require either a patient transfer after the system is properly situated on the mattress, or the patient to be temporarily repositioned during placement of the system. Further, the aforementioned systems are cumbersome to store and retrieve with each use.

Therefore, a need exists in the art for a system for supporting and positioning a person designed to overcome one or more of the aforementioned disadvantages.

SUMMARY

According to certain aspects, a system for supporting and positioning a person includes a flexible cover layer defining a support surface for the person, and a formable layer coupled to the flexible cover layer and positioned opposite the support surface. The formable layer includes a sealed bladder adapted to be in fluid communication with a vacuum source for selectively providing a vacuum to the sealed bladder to move the system between a first configuration in the absence of the vacuum, and a second configuration in the presence of the vacuum. The formable layer further includes particles disposed within the sealed bladder and adapted to be substantially movable relative to one another in the first configuration such that a contour is provided to the support surface by applying forces to the flexible cover layer to alter a shape of the formable layer, and substantially immovable relative to one another in the second configuration such that the particles contact one another to provide rigidity to the formable layer to maintain the contour provided to the support surface.

According to certain aspects, the system may include a vacuum source, a flexible cover layer defining a support surface, and a formable layer coupled to the flexible cover layer and positioned opposite the support surface. The formable layer includes a sealed bladder in fluid communication with the vacuum source for selectively providing a vacuum within the sealed bladder to move the system between a first configuration in the absence of the vacuum, and a second configuration in the presence of the vacuum. The formable layer further includes particles disposed within the sealed bladder. One or more sensors responsive to forces are on the support surface and adapted to generate load signals. A controller is coupled to the sensors and the vacuum source and configured to control the vacuum source to move the system between the first and second configurations.

According to certain aspects, a system for supporting and positioning a person includes a flexible cover layer defining a support surface for the person, and a multifunctional layer coupled to the flexible cover layer and positioned opposite the support surface. The multifunctional layer is defined by a plurality of formable zones. Each of the zones includes a sealed bladder in fluid communication with a vacuum source for selectively providing a vacuum to the sealed bladder to move the system between a first configuration in the absence of the vacuum, and a second configuration in the presence of the vacuum. Each of the zones further includes particles disposed within the sealed bladder and adapted to be substantially movable relative to one another in the first configuration such that a contour is provided to the support surface by applying forces to the flexible cover layer, and substantially immovable relative to one another in the second configuration such that the particles contact one another to provide rigidity to the formable layer to maintain the contour provided to the support surface. The multifunctional layer further includes a plurality of cushioning zones exclusive from the formable zones and including cushioning.

According to certain aspects, a system for supporting and positioning a person includes a seat section, and a back section coupled to and angled relative to the seat section to form a chair assembly. Each of the seat section and the back section include a flexible cover layer defining a support surface for supporting the person, and a formable layer coupled to the flexible cover layer and positioned opposite the support surface. The formable layer includes a sealed bladder in fluid communication with a vacuum source for selectively providing a vacuum to the sealed bladder to move the system between a first configuration in the absence of the vacuum, and a second configuration in the presence of the vacuum. The formable layer further includes particles disposed within the sealed bladder and adapted to be substantially movable relative to one another in the first configuration, and substantially immovable relative to one another in the second configuration.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
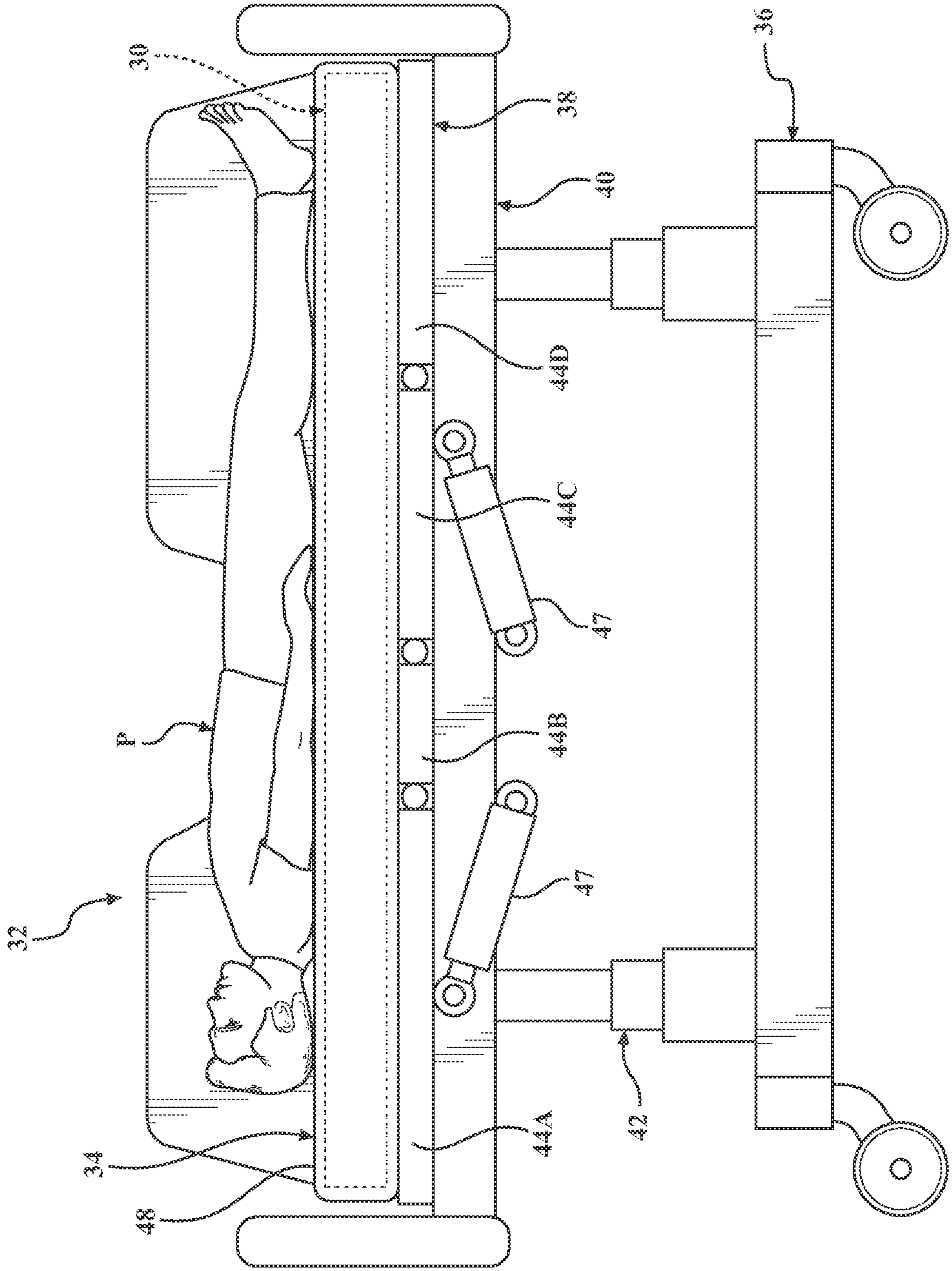
FIG. 1 is an elevation view of a support apparatus including a mattress supporting a person with the mattress including a positioning system.
Figure 2:
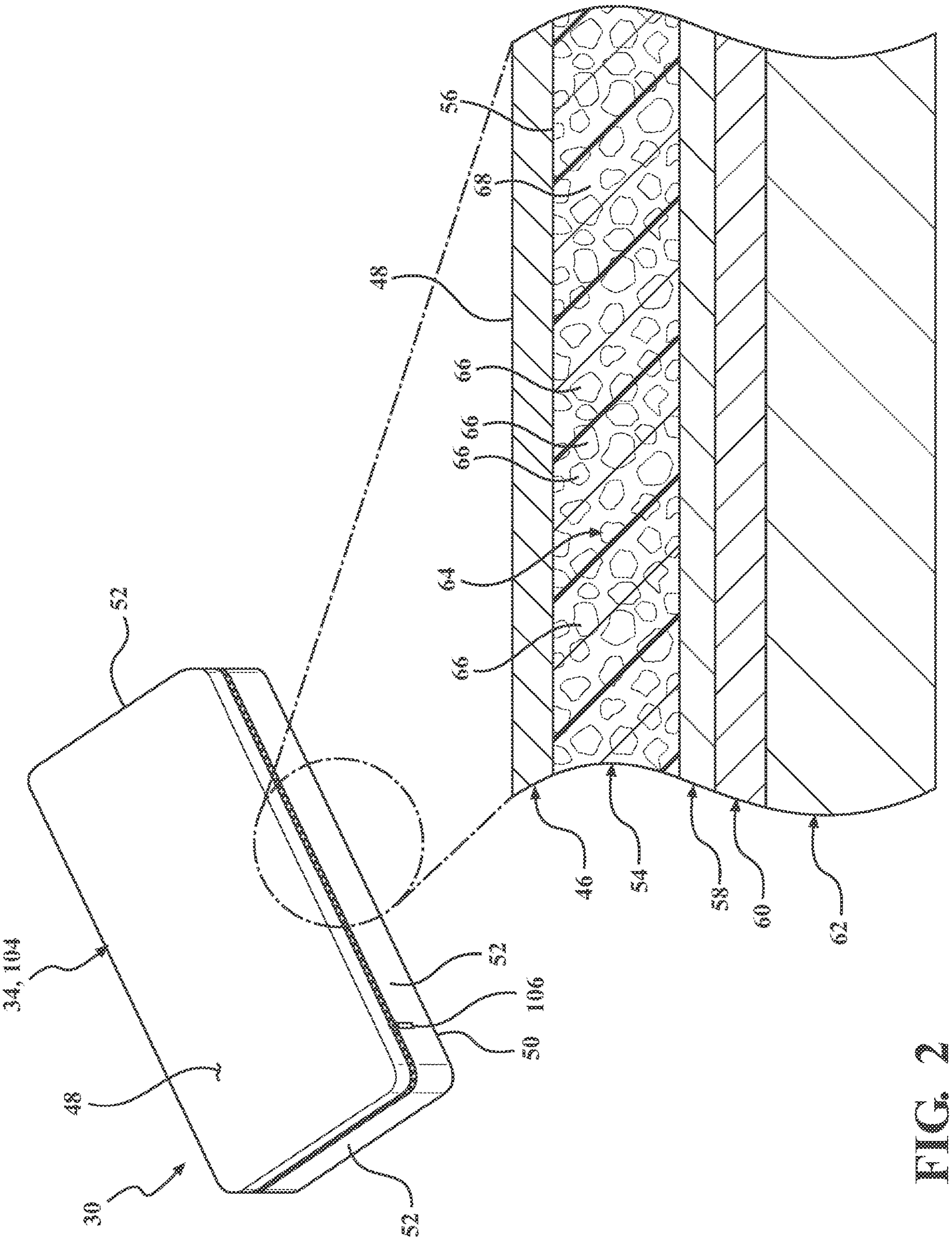
FIG. 2 is a perspective view of the mattress of FIG. 1 with a detailed sectional view of layers of the mattress.
Figure 3:
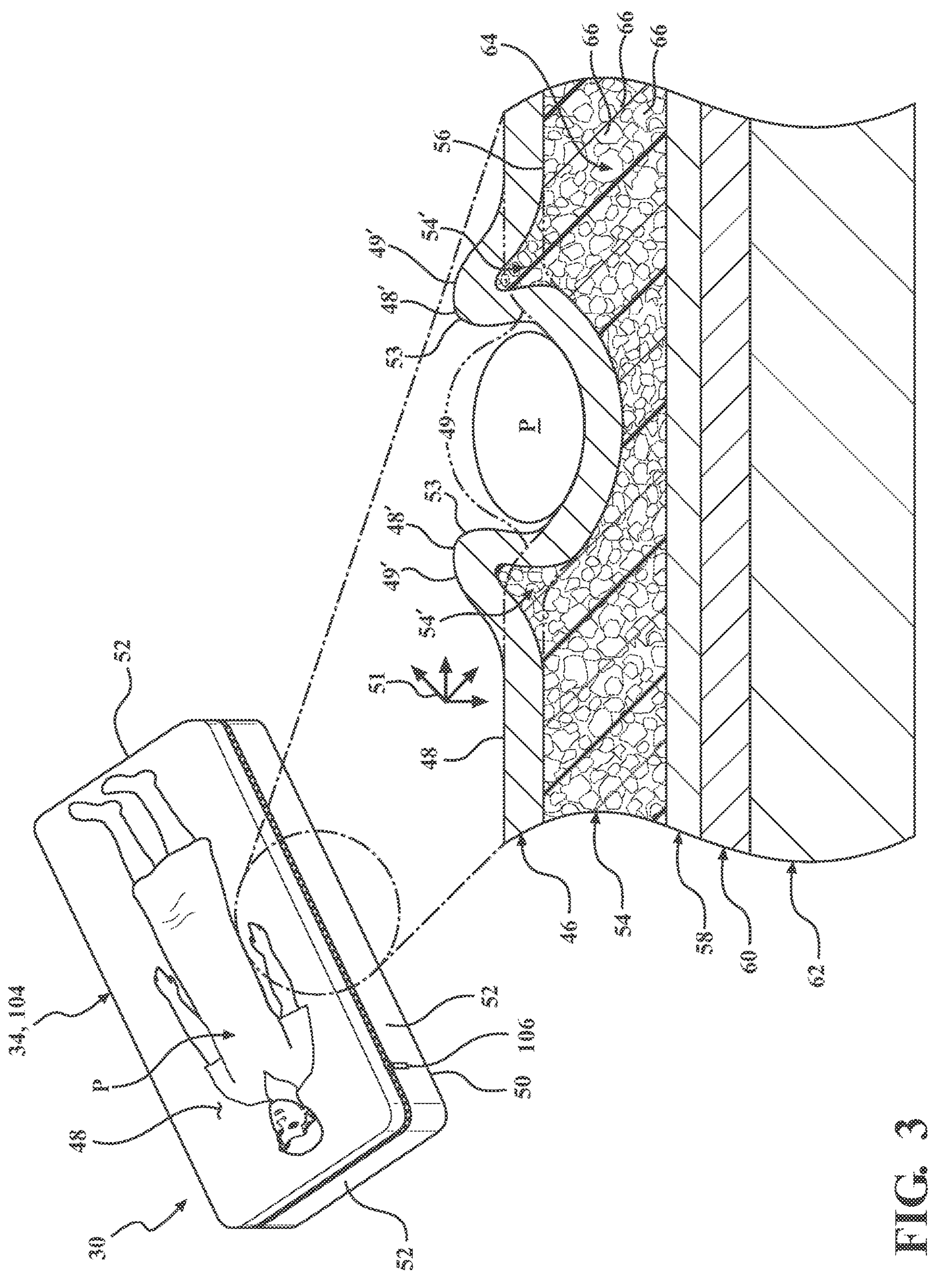
FIG. 3 is a perspective view of the mattress of FIG. 1 with the person supported thereon, and a detailed sectional view of layers of the mattress with the positioning system in a second configuration.

FIGS. 1-3 illustrates a person (P) supported on a support apparatus 32 including a positioning system 30 represented schematically in phantom. The support apparatus 32 shown in FIG. 1 is a hospital bed, but alternatively may be a stretcher, cot, trolley, gurney, wheelchair, chair assembly (see FIG. 6), or other suitable support or transport apparatus. The support apparatus 32 may include a base 36 adapted to rest upon a floor surface, and a support deck 38 coupled to the base 36. In certain embodiments, an intermediate frame 40 is spaced above the base 36 with the support deck 38 coupled to or disposed on the intermediate frame 40. A mattress 34 is supported on the support deck 38. A lift device 42, such as linear actuators, may be operably coupled to the intermediate frame 40 and the base 36 for moving the support deck 38 relative to the base 36. Further, the support deck 38 may include articulating sections 44, such as a fowler 44A, a seat section 44B, a thigh section 44C, a leg section 44D, and the like, movably coupled to actuators 47. For example, the fowler 44A may be moved between a first position in which the person is supine, as illustrated in FIG. 1, and a second position in which the torso of the person is positioned at an incline. For another example, a gatch maneuver may be performed in which the positions of the thigh and/or leg sections 44C, 44D are adjusted.

FIGS. 2 and 3 show the positioning system 30 in accordance with an exemplary embodiment of the present disclosure. The positioning system 30 of the present embodiment is integrated with or otherwise coupled to the mattress 34. In particular, FIG. 2 shows the mattress 34 with a detailed sectional view of the layers of the mattress 34 with the positioning system 30 in a first configuration to be described, and FIG. 3 includes the person supported on the mattress 34 with the positioning system in a second configuration to be described. The mattress 34 includes a support surface 48, a lower surface 50 opposite the support surface 48, and sides 52 that extend between the support and lower surfaces 48, 50. The support surface 48 is sized to support at least a majority of the person such that, absent bedding and the like, the person is supported by and in contact with the support surface 48. In another embodiment to be described, the positioning system 30 is integrated with a mattress cover 104 adapted to be removably coupled with the mattress 34.

The positioning system 30 includes a flexible cover layer 46 defining the support surface 48 supporting the person. The flexible cover layer 46 may be considered the outermost layer or uppermost of the mattress 34. The flexible cover layer 46 may be thinner relative to certain other layers of the mattress 34 to be described. With reference to FIGS. 2 and 3 (not necessarily to scale), the flexible cover layer 46 may be notably thin (e.g., a “skin”), or it may have a thickness of 0.5, 1.0, or 2.0 or more inches. Further, the thickness of the flexible cover layer 46 may be substantially constant across an entirety of the layer 46, or certain areas of the flexible cover layer 46 may be thicker than others. The flexible cover layer 46 may be incompressible under load (i.e., maintains constant thickness), or formed from materials that provide compressibility for the comfort of the person supported thereon. The materials of the cover layer 46 impart suitable flexibility such that the cover layer 46 may deform to assume any desired shape. In one example, the flexible cover layer 46 is formed primarily from polyurethane, but other suitable materials are contemplated, such as those formed from one or a combination of resins, epoxies, natural or synthetic fibers, polyesters, foams, polymeric materials, elastic materials, viscoelastic materials, and the like.

The positioning system 30 includes a formable layer 54 coupled to the flexible cover layer 46. FIGS. 2 and 3 show the formable layer 54 coupled to the flexible cover layer 46 at an interface 56 extending between the two layers 46, 54. The interface 56 may be such that the flexible cover layer 46 and the formable layer 54 are positioned adjacent, in abutment or direct contact, and/or in a flat-on-flat relationship. In embodiments where the layers 46, 54 are of constant thickness, the interface 56 is planar. The interface 56 may be at a side of the flexible cover layer 46 opposite the support surface 48. In other words, the formable layer 54 is positioned adjacent the flexible cover layer 46 opposite the support surface 48. The coupling between the layers 46, 54 at the interface 56 may be facilitated by ultrasonic welding, adhesive, or other suitable joining means, such that the layers 46, 54 are immovable relative to one another. The formable layer 54 is designed to assume a contour based on forces applied to the support surface 48, and thereafter “hold” the contour to maintain the position the person in manners to be described.

In certain embodiments, the mattress 34 includes foam, viscoelastic, fluid and/or membrane layers, among other layers and features, such as those incorporated into the IsoFlex™, Isolibrium™, ComfortGel™, PositionPRO™, ProForm™, BariMatt™ and UltraComfort™ support surfaces manufactured by Stryker Corporation (Kalamazoo, Mich.). For example, a fluid circulation layer 58 may be disposed within the mattress 34 and configured to supply to or remove heat from the cover layer 46 with fluid circulating through radiofrequency welded channels. An inner membrane layer (not shown) may be provided within the mattress 34 with the inner membrane layer in fluid communication with a source of air. The air is moved through the inner membrane layer to control humidity or the microclimate for person comfort. Further, a fire barrier layer 60 may be disposed within the mattress 34 with the fire barrier layer 60 formed from materials having flame-retardant properties. One exemplary fire barrier layer 60 suitable for the present application is provided under the tradename NoMex (DuPont Company, Wilmington, Dela.). The mattress 34 includes a cushioning layer 62 that may be formed of foam or other suitable materials. The cushioning layer 62 is disposed within the mattress 34 with the formable layer 54 positioned intermediate the flexible cover layer 46 and the cushioning layer 62. In one example, the structure of the cushioning layer 62 takes the form of honeycombs that are adapted to resiliently buckle when supporting the person on the flexible cover layer 46 of the mattress 34. Still further, in certain embodiments the mattress 34 may include a self-healing layer (not shown) in direct contact with the flexible cover layer 46. The self-healing layer may be relatively thin and formed from a low-durometer poured urethane with the capability of self-sealing in the event of small, inadvertent punctures from sharps. It is to be understood that the construction of the layers 54, 58, 60, 62 internal to the flexible cover layer 46, as shown in FIGS. 2 and 3, is one non-limiting arrangement. The layers may be alternatively arranged in any suitable manner, and the mattress 34 may include greater or fewer layers than those described.

With continued reference to FIGS. 2 and 3, the formable layer 54 of the positioning system 30 includes at least one sealed bladder 64 and particles 66 disposed within the sealed bladder 64. The sealed bladder 64, as implied by its name, is a sac-like structure formed from fluid impermeable material(s). The sealed bladder 64 may or may not be formed from expandable materials. The sealed bladder 64 is configured to selectively maintain a volume of fluid, also referred to herein as a medium 68. In one embodiment, the medium 68 may be air and/or another gaseous fluid, but it is also contemplated the medium 68 may include liquid, viscoelastic materials, and/or other phase-changing substances. The sealed bladder 64 is in fluid communication with a vacuum source 70 (see FIG. 4) for selectively providing a vacuum to the sealed bladder 64. In manners to be described, the positioning system 30 moves between a first configuration in the absence of the vacuum, and a second configuration in the presence of the vacuum.

The particles 66 are disposed within the sealed bladder 64. In one example, the particles 66 are disposed within the medium 68 in a substantially random arrangement, as generally shown in FIG. 2. The particles 66 may be beads that are substantially incompressible, such as being at least partially formed from glass or substantially incompressible polymeric material(s). In some configurations, the particles 66 may be compressible, such as being at least partially formed from substantially compressible polymeric materials, such as polystyrene. The compressible particles 66 may be formed from materials with shape memory properties such that, the particles 66 compress or deform under the influence of the vacuum and return to an original shape after removal of the vacuum. One example includes an alloy of nickel and titanium (i.e., Nitinol). Other examples include elastic polymers such as rubber, silicone, magnetorheological elastomers (MREs), shape memory foam, and the like. The particles 66 may be solid or hollow, the latter being well suited for particles 66 that are compressible to collapse and improve frictional engagement between the particles 66 under the influence of the vacuum provided to the sealed bladder 64. The particles 66 being hollow may further reduce weight of the particles 66 and the system 30. Other characteristics of the particles 66 are also contemplated. For example, one or more of the particles 66 may include a core and an outer layer. The core may be incompressible with the outer layer compressible, or the core may be compressible with the outer layer incompressible. For another example, one or more of the particles 66 may include a core, and inner layer, and an outer layer. The core may be incompressible with the outer layer compressible, and with the inner layer compressible to a lesser extent than the outer layer (i.e., a hard-to-soft gradient from the core to the outer layer). Conversely, the core may be compressible with the outer layer incompressible, and with the inner layer incompressible to a lesser extent than the outer layer (i.e., a soft-to-hard gradient from the core to the outer layer). Still another example includes the core being hollow with the inner layer and/or the outer layer being compressible or incompressible. The hollow core may further contain a fluid (e.g., water, oil, saline, magnetorheological fluid) and/or amorphous materials.

The particles 66 may be uniformly and/or irregularly shaped. Particles 66 of uniform shape may generally be defined as a shape having one or more lines of symmetry. For example, the particles 66 of uniforms shape may include a sphere, cone, cylinder, cube, cuboid, tetrahedron, helix dodecahedron, triangular prism, icosahedron, octahedron, torus, ellipsoid, hexagonal prism, square pyramid, pentagonal prism, octagonal prism. Particles 66 of irregular shape may include, for example, "peanut"-shaped structures akin to shipping materials or shapes without lines of symmetry. The irregular shape of the particles 66 may facilitate improved frictional engagement between adjacent particles 66, particularly under the influence of the vacuum provided to the sealed bladder 64. It is further contemplated that the sealed bladder 64 may contain a combination of particles 66 having one or more of the aforementioned properties and/or characteristics. For example, a combination of particles 66 may include the same or different shapes, sizes, compressibility properties, layers (with or without hollow cores), and the like.

In embodiments where the medium 68 is a viscous, viscoelastic, or similar substance, the random arrangement of the particles 66 may include some of the particles 66 being suspended within the medium 68 in the first configuration. In other embodiments where the medium 68 is fluid such as air, the random arrangement of the particles 66 may include many of the particles 66 loosely collecting within the sealed bladder 64 in the first configuration under the influence of gravity. It is further contemplated that the particles 66 may be arranged (or assume an arrangement based on construction of the system 30) in layers within the sealed bladder 64. Each of the layers of particles 66 within the sealed bladder 64 may include particles 66 having same or different properties and/or characteristics described above (e.g., size, shape, compressibility, etc.). For example, a lower layer may include regularly-shaped particles 66 of relative incompressibility, and an upper layer (i.e., nearer to the support surface 48) includes irregularly-shaped particles 66 of relative compressibility.

With the positioning system 30 in the first configuration (i.e., the absence of a vacuum provided to the sealed bladder 64), the particles 66 disposed within the sealed bladder 64 are substantially movable relative to one another. The positioning system 30 in the first configuration is represented schematically in FIG. 2 with spacing shown between the particles 66 (to indicate the particles 66 may move freely relative to one another). In practice, in the first configuration the weight from the flexible cover layer 46, bedding, the person situated on the support surface 48, and the like, results in the particles 66 generally being loosely agglomerated within the sealed bladder 64 such that the particles 66, while in contact with other particles 66, remain substantially movable relative to one another. The movement of the particles 66 accommodates forces on the formable layer 54 in the first configuration. In particular, the forces on the formable layer 54 are those provided to the flexible cover layer 46. For example, the weight of the person situated on the support surface 48 provides a contour 49 to the flexible cover layer 46. The contour 49 provided to the flexible cover layer 46 alters a shape of the flexible cover layer 46 and the formable layer 54 with the positioning system 30 in the first configuration. The particles 66 move relative to and are compressed against one another as the shape of the flexible cover layer 46 and the formable layer 54 is altered. In many respects, the particles 66 accommodating the alteration in shape of the flexible cover layer 46 and the formable layer 54 acts to cushion the person supported on the support surface 48. FIG. 3 shows the person (P) supported on the support surface 48 with a detailed sectional view of a portion of the position system 30 near an arm of the person. The weight of the arm causes a depression in a portion of the support surface 48 and the formable layer 54. The arm is situated within the depression such portions of the support surface 48 (and perhaps the formable layer 54) adjacent the arm extends above a level of the lowest most point of the arm. In other words, the arm is somewhat supported laterally on each side by adjacent portions of the support surface 48 (and perhaps the formable layer 54).

Yet with the positioning system 30 in the first configuration such that the particles 66 are substantially movable relative to one another, the lateral support provided by the support surface 48 may be considered relatively minor. In other words, the shape of the flexible cover layer 46 and the formable layer 54 may be further altered with relative ease. In the example illustrated in FIG. 3, the lateral support provided to the arm of the person may be overcome with relative ease with the person laterally moving his or her arm along the support surface 48. This may be undesirable in instances where the intended treatment includes maintaining the clinically suitable position of the arm.

The positioning system 30 advantageously provides for operating in the second configuration to maintain the shape of the formable layer 54, and thus the contour provided to the support surface 48. With continued reference to FIGS. 2 and 3, the vacuum source 70 is operated to move the system 30 from the first configuration to the second configuration in which the particles 66 contact one another and become substantially immovable relative to one another. The vacuum source 70 provides the vacuum to the sealed bladder 64 to draw out the medium 68 from within the sealed bladder 64. The particles 66 are drawn into firm contact with one another, or if previously loosely agglomerated within the sealed bladder 64, drawn increasingly into firm contact with one another. In one sense, a packing efficiency or density of the particles 66 within the sealed bladder 64 is increased with the result being lattice-like in arrangement of the particles 66. FIG. 3 shows the particles 66 in the second configuration (the medium 68 is not identified in FIG. 3, as it is considered to be substantially removed under the influence of the vacuum). With the particles 66 contact with and substantially immovable relative to one another, rigidity is provided to the formable layer 54. The rigidity maintains the contour 49 provided to the support surface 48 and the contour 49 may provide the lateral support to the person. In effect, the lateral support provided by the support surface 48 may be considered relatively greater in the second configuration than in the first configuration. In other words, the shape of the flexible cover layer 46 and the formable layer 54 may no longer be further altered with relative ease. In the example illustrated in FIG. 3, the lateral support provided to the arm of the person will not be overcome with relative ease by laterally moving his or her arm along the support surface 48. This may facilitate maintaining the clinically suitable position of the arm with the positioning system 30 rendering the mattress 34 a "patient positioner" without the need for external devices. Further, the positioning system 30 utilizing the vacuum source 70 will maintain the shape over time without loss of shape and effectiveness.

With continued reference to FIG. 3, it is further contemplated that an exaggerated or enhanced contour 49' may be provided to the support surface 48'. In the previous description, the contour 49 was based on the weight of the arm of the person resulting in the depression in the mattress 34. For illustrative purposes, FIG. 3 shows the contour 49 extending about a lower half of the arm of the person. The enhanced contour 49' is provided to the support surface 48' by applying forces, such as supplemental forces, to more greatly alter the shape of the flexible cover layer 46 and the formable layer 54. The supplemental forces are applied to the flexible cover layer 46 with the positioning system 30 in the first configuration. The supplemental forces result in portions of the flexible cover layer 46' and the formable layer 54', and more particularly the portions adjacent the person, being altered to more greatly form about or be contoured to the person. For example, the supplemental forces may be provided by a caregiver in which the caregiver applies the forces to the flexible cover layer 46 in the direction of arrows 51 to provide localized peaks 53 adjacent to and generally contoured to the anatomy of the person. Owing to the particles 66 being substantially movable relative to one another in the first configuration, the enhanced contour 49' defining the localized peaks 53 may be provided with relative ease. FIG. 3 shows the localized peaks 53 extending above the arm of the person such that the arm of the person is subsumed within the depression or cavity defined by the enhanced contour 49' of the support surface 48. Further, the shape of formable layer 54' associated with the localized peaks 53 is correspondingly exaggerated or enhanced. With the enhanced contour 49' provided to the flexible cover layer 46 resulting in the enhanced shape of the formable layer 54', the vacuum source 70 is operated to move the system 30 from the first configuration to the second configuration in which the particles 66 contact one another and become substantially immovable relative to one another in the manner previously described. In one example, the caretaker may maintain the enhanced contour 49' (e.g., with the supplemental forces) while the vacuum is being provided to the sealed bladder 64 to move the system 30 from the first configuration to the second configuration. When the formable layer 54' is suitably rigid such that the enhanced contour 49' is sufficiently maintained, the caretaker may remove the supplemental forces from the flexible cover layer 46. In another example, the medium 68 includes another viscous substance such that the enhanced contour 49' is maintained for a period sufficient to provide the vacuum to the sealed bladder 64. In the present embodiment including the enhanced contour 49', even greater lateral support is provided by the support surface 48 to maintain the clinically suitable position of the person. The contour 49, 49' of the support surface 48 may be quickly adjusted on demand without the need for procuring and substituting multiple external devices. It is to be further understood that the shape illustrated in FIG. 3 is one non-limiting example, and any desired shape(s) may be achieved using the positioning system 30.

The positioning system 30 is further configured to move from the second configuration to the first configuration. With the positioning system 30 in the second configuration in which the particles 66 are in contact with and substantially immovable relative to one another, the vacuum source 70 is operated in reverse (e.g., the vacuum is released to atmosphere or a pump is provided separately). The medium 68 is urged into the sealed bladder 64 in fluid communication with the vacuum source 70 or pump. The medium 68 permeates the interstices of the particles 66 causing a lessening of the rigidity of the formable layer 54. Once the particles 66 are considered substantially moveable relative to one another (which may or may not be in contact), system 30 may be considered in the first configuration. It is to be understood that the positioning system 30 may further be configured to operate in an intermediate configuration, which functionally may be considered any configuration between the first and second configurations. In other words, a partial vacuum may be provided to the sealed bladder 64 in which firmer contact between the particles 66 prevents movement as described for the first configuration, but does not render the particles 66 substantially immovable relative to one another as described for the second embodiment. In this intermediate configuration, the formable layer 54 may be partially rigid and the contour 49, 49' of the support surface 48 partially maintained.

Figure 4:
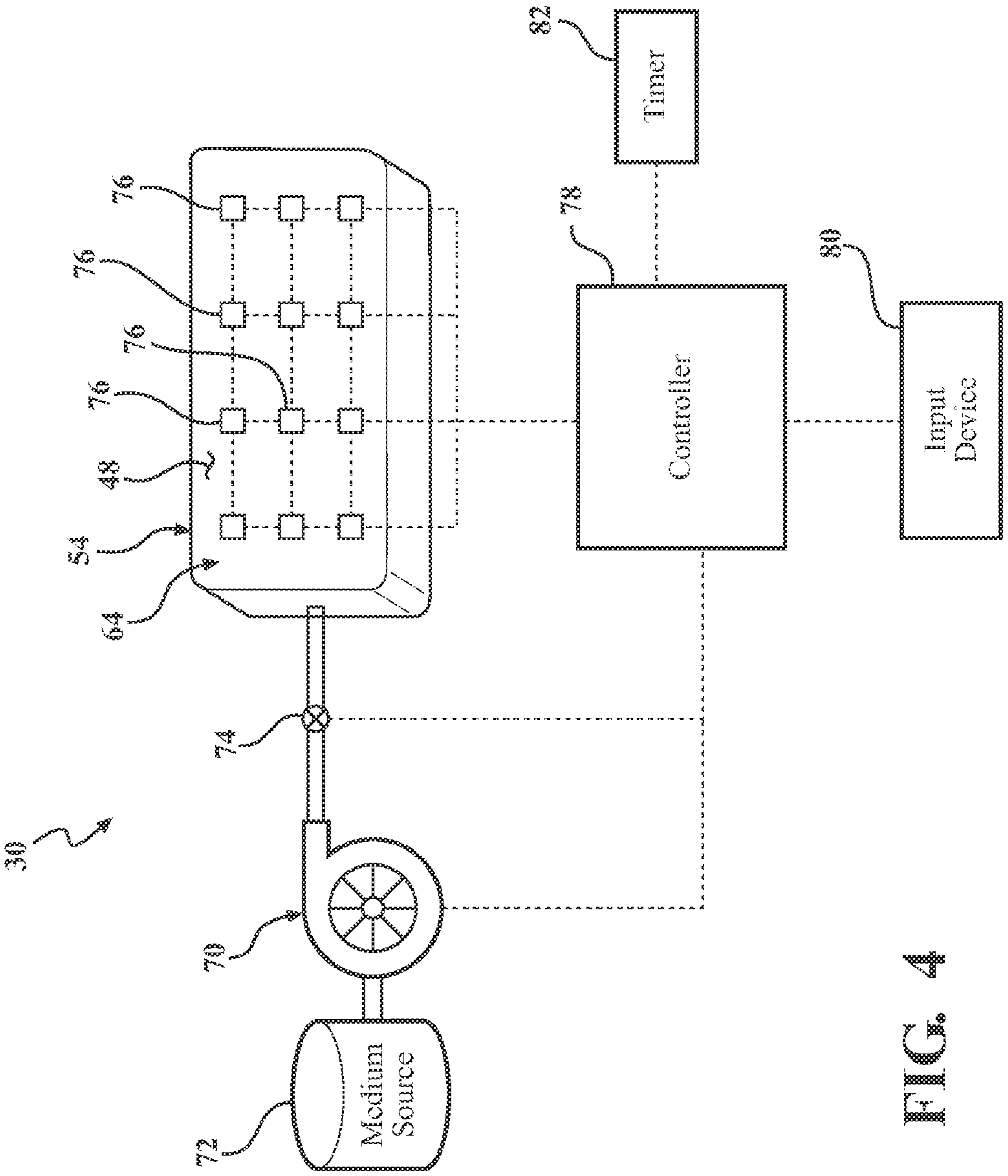
FIG. 4 is a representation of the positioning system including a medium source, a vacuum source, valve, and electronic components represented schematically.

Referring now to FIG. 4, the positioning system 30 includes the vacuum source 70. Depending on the substance forming the medium 68 within the sealed bladder 64, the vacuum source 70 may be in fluid communication with a medium source 72. For example, if the medium 68 is air, the vacuum source 70 may simply expel the air to the ambient as the system 30 moves from the first configuration to the second configuration. If the medium 68 is not air (e.g., a liquid and/or viscoelastic material) that is to be recycled into the sealed bladder 64 as the system 30 moves between the first and second configurations, the medium source 72 may be provided to receive the medium 68. The positioning system 30 may include at least one valve 74 in fluid communication with the vacuum source 70 and the sealed bladder 64. The valve 74 of FIG. 4 is shown remote from the mattress 34, however, it is to be understood the valve 74 may be coupled to the sealed bladder 64 or positioned at any suitable location to seal the bladder 64 in an appropriate manner.

The positioning system 30 may include an input device 80. The input device 80 is adapted to receive an input from the person supported on the positioning system 30, or from a secondary user such as a caregiver. For example, the input device 80 may be a switch, button, keyboard, keypad, and the like. In other implementations, the input device 80 is part of an interface (not shown) integrated with the support apparatus 32, such as on a side rail. It is also contemplated that the input device 80 may be embodied as an “app” on an electronic device, such as a smartphone, tablet, voice-activated assistant, and the like. The positioning system 30 includes a controller 78 coupled to the input device 80 and the vacuum source 70. The controller 78 may also be coupled to the valve(s) 74. The input device 80 is adapted to receive an input from the person supported on the positioning system 30, or from a secondary user such as a caregiver. The controller 78 controls the vacuum source 70 to move the system 30 between the first and second configurations, and in particular, in response to the input device 80 receiving the input. For example, one exemplary method of supporting and positioning the person on the positioning system 30 includes positioning the person on the support surface 48 of the mattress 34 with the system 30 in the first configuration in which the particles 66 within the medium 68 are substantially movable relative to one another. Forces are applied to the flexible cover layer 46 in the manner previously described to alter the formable layer 54 and provide the contour 49, 49' to the support surface 48 of the mattress 34 near the person. The input is provided to the input device 80, and the controller 78 operates the vacuum source 70 to move the system 30 from the first configuration to the second configuration in which the particles 66 are substantially immovable relative to one another to provide rigidity to the formable layer 54 to prevent further alteration of the formable layer 54 and maintain the contour 49, 49' provided to the support surface 48 of the mattress 34.

The positioning system 30 may include one or more sensors 76 coupled to the controller 78. The sensors 76 may be coupled to the flexible cover layer 46, the formable layer 54, or any other layer 58, 60, 62 or structure of the mattress 34. FIG. 4 shows the sensors 76 including twelve sensors arranged in a rectangular array. Other arrangements and quantities of sensors 76 are contemplated. The sensors 76 are responsive to forces on the support surface 48. For example, the sensors 76 are load cells, such compression-type, bending beam-type, hydraulic, pneumatic, strain gauge, and other transducers configured to detect forces on the support surface 48 and generate load signals in response to the same. The load signals are transmitted to the controller 78. In manners to be described, the system 30 is advantageously designed to anticipate a state or behavior of the person and move between the first and second configurations in a responsive manner.

In certain embodiments, the controller 78 is configured to control the vacuum source 70 to operate the system 30 in the first configuration when the load signals from the sensors 76 are indicative of an absence of forces applied to the flexible cover layer 46. In other words, if no person is supported on the support surface 48 (e.g., positioned on the mattress 34), the system 30 operates in the first configuration. Thus, when the person is to be situated on the support surface 48, the formable layer 54 will lack rigidity and provide an expected cushioned feeling during the transfer. The controller 78 may include a timer 82 or timer function that is configured to measure elapsed time between load signals received from the sensors 76 and the absence of load signals received from the sensors 76. The controller 78 may be further configured to control the vacuum source 70 to operate the system 30 in the first configuration when the load signals from the sensors 76 are indicative of an absence of forces applied to the flexible cover layer 46 for a predetermined period of time (e.g., one, two, or five or more minutes). Such an indication may be suggestive that, for example, the person has egressed from the support surface 48.

The controller 78 may be further configured to control the vacuum source 70 to operate the system 30 in the second configuration when the load signals from the sensors 76 are indicative of stable forces applied to the flexible cover layer 46 for a predetermined period of time. The detection of forces by the sensors 76 is at least suggestive of the presence of the person on the support surface 48. The forces may be required to exceed a threshold, as measured by the sensors 76 and determined by the controller 78, to ensure the forces are secondary to the presence of the person situated on the support surface 48 (as opposed to being incidental or accidental contact with the support surface 48). After the predetermined period of the stable forces has elapsed, as measured by the timer 82 and determined by the controller 78, the controller 78 controls the vacuum source 70 to operate the system 30 in the second configuration. Such a feature is designed to at least assume that the person situated on the support surface 48 is not moving more than minimally, and comfort may be realized from the system 30 providing rigidity to the formable layer 54 in a manner that conforms about the person. Such a feature may be considered an aspect of an "auto detect mode." This aspect of the auto detect mode may be activated or deactivated on the input device 80.

Another aspect of the auto detect mode may include the controller 78 being configured to control the vacuum source 70 to move the system 30 from the second configuration to the first configuration in response to the load signals from the sensors 76 indicating a change in the forces applied to the flexible cover layer 46. In other words, when the person situated on the support surface 48 begins to move more than minimally, the system 30 rapidly moves from the second configuration to the first configuration to accommodate the movement. The forces may be required to exceed a threshold, as measured by the sensors 76 and determined by the controller 78, to ensure the movement of the person situated on the support surface 48 is intentional and deliberate and not merely incidental. This aspect of the auto detect mode may also be activated or deactivated on the input device 80. This aspect of the auto detect mode is to be discussed in further detail with the embodiment of the positioning system 30 integrated with a chair assembly 134 (see FIG. 6).

Figure 5:
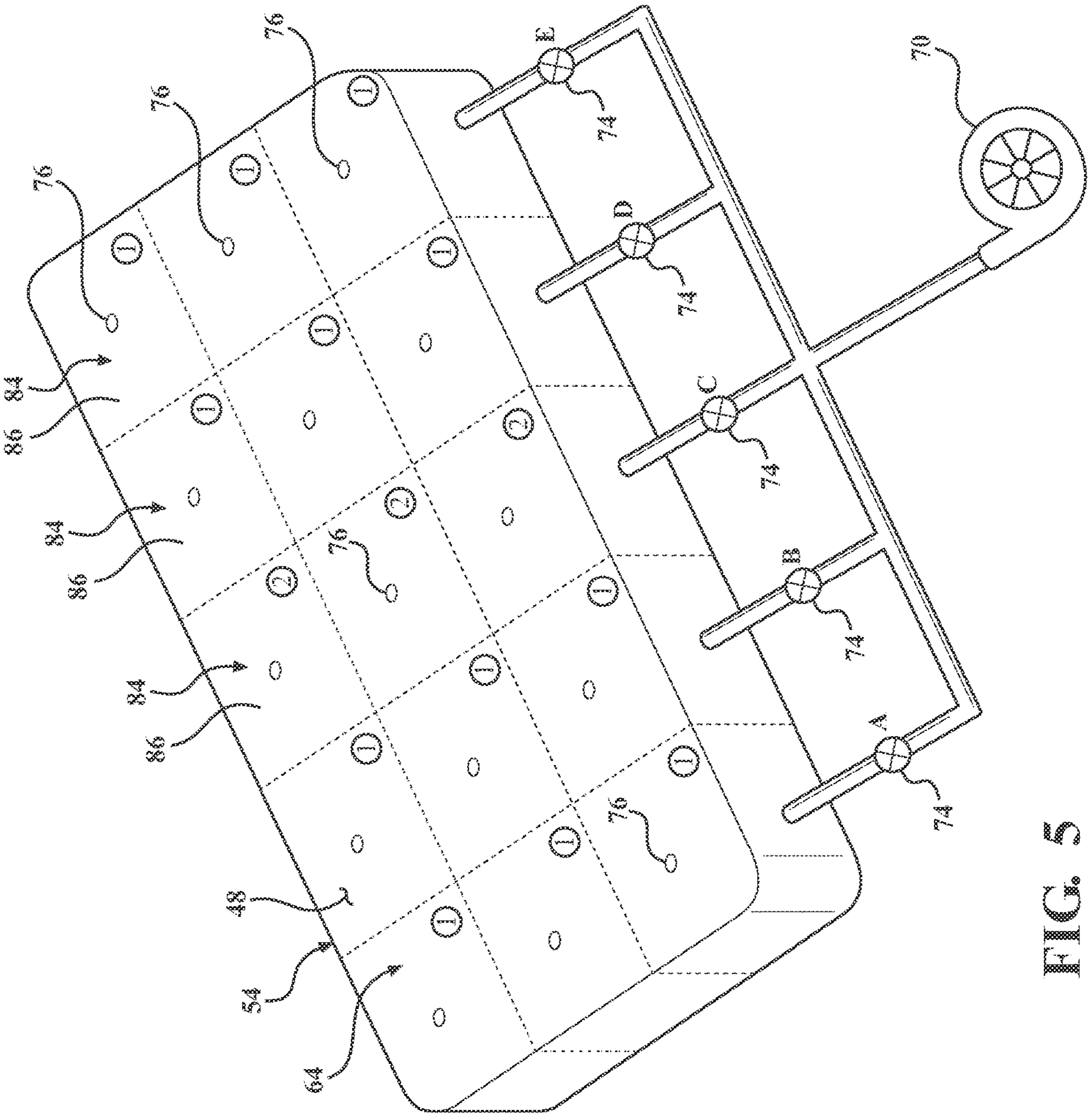
FIG. 5 is a perspective view of a formable layer of the positioning system in accordance with another exemplary embodiment of the present disclosure with a plurality of zones defining the formable layer.

FIG. 5 shows the formable layer 54 in accordance with another exemplary embodiment of the present disclosure. The formable layer 54 may be defined by a plurality of zones 84 represented schematically in FIG. 5. The controller 78 may control the vacuum source 70 and the valves 74 to move the system 30 between the first and second configurations for each of the zones 84. In other words, at least one of zones 84 defining the formable layer 54 may be in the first configuration while at least one of the other zones 84 defining the formable layer 54 may be in the second configuration. For example, the formable layer 54 includes the sealed bladder 64 defining a plurality of sealed compartments 86. The sealed compartments 86 may be sub-volumes within the volume of the sealed bladder 64. Alternatively, the sealed compartments 86 may be discrete bladders positioned within the formable layer 54. In the exemplary embodiment of FIG. 5, each of the sealed compartments 86 is associated with one or more of the zones 84 defining the formable layer 54. The sealed compartments 86 are in fluid communication with the vacuum source 70. The valves 74 coupled to the controller 78 are in fluid communication with one or more of the sealed compartments 86. FIG. 5 shows five valves 74 (A, B, C, D, E) coupled in parallel to the sealed compartments 86 along a length of the formable layer 54. There also may be internal valves (not shown) operably coupled between an adjacent two of the sealed compartments 86 with the valves coupled to the controller 78.

The controller 78 is configured to selectively actuate one or more of the valves 74 such that the vacuum source 70, when operated by the controller 78, provides the vacuum to one or more of the sealed compartments 86. In one implementation, less than all of the zones 84 of the system 30 may be independently moved between the first and second configurations. FIG. 5, for example, assumes the vacuum source 70 is operating with one of the valves 74 (valve C) opened such that three of the zones 84 are in the second configuration (2). The remaining valves 74 (valves A, B, D, E) are closed such that the remaining zones 84 are in the first configuration (1). The zones 84 in the second configuration, in the example of FIG. 5, would be positioned near the a midsection of the person such that the formable layer 54 about the torso or buttocks of the person would become rigid and maintain the contour and provide lateral support to the person for reasons previously described. The zones 84 in the first configuration would be positioned near the head and legs of the person such that the formable layer 54 in these areas deform more readily for the comfort of the person.

One or more of the sensors 76 may be associated with each of the zones 84. The sensors 76 generate the load signals based on the sensed forces on the support surface 48 within each of the zones 84 and transmit the load signals to the controller 78. The controller 78 controls the vacuum source 70 and the valves 74 to selectively provide the vacuum to one or more of the sealed compartments 86 to move one or more of the zones 84 of the system 30 between the first and second configurations. The aforementioned features, such as the aspects of the auto detect mode, may be utilized in the present embodiment to responsively accommodate movement of the person on one area of the support surface 48 without requiring the entire formable layer 54 to become less or more rigid as the system 30 moves between the first and second configurations, respectively. For example and with continued reference to FIG. 5, it is assumed the person is situated on the support surface 48 and all of the zones 84 are in the second configuration based on stable forces detected by the sensors 76 for the predetermined period. The person begins to move his or her lower extremities, and the sensors 76 within these zones 84 detect the change in the sensed forces. The controller 78, in response to the load signals received from the sensors 76, operates the vacuum source 70 as a pump and the valves 74 (in this example, valves D and E) to rapidly move the corresponding zones 84 from the second configuration to the first configuration. Once the person is repositioned to his or her satisfaction, the further lack of movement of the person results in stable forces detected by the sensors 76. The predetermined period as measured by the timer 82 elapses, and the controller 78 operates the vacuum source 70 the valves 74 (valves D and E) to return the corresponding zones 84 to the second configuration. It is to be understood that the above example is non-limiting, and the positioning system 30 may be operated in any number of varied ways in view of the foregoing description.

Figure 6:
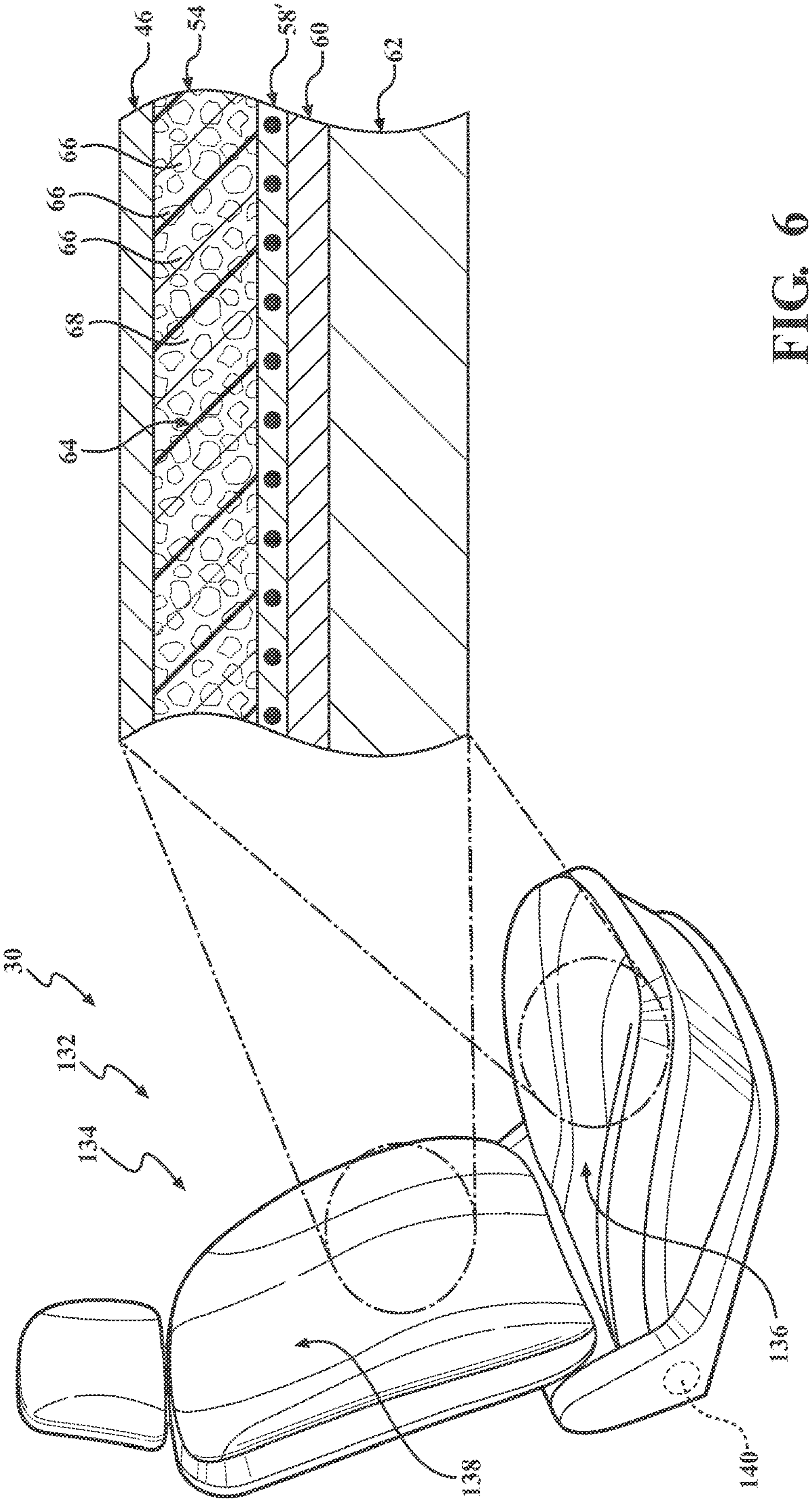
FIG. 6 is a perspective view of a chair assembly with a detailed sectional view of layers forming seat and back sections of the chair assembly.

The positioning system 30 of FIG. 6 is embodied in a support apparatus 132 in accordance with another exemplary embodiment of the present disclosure. The support apparatus 132 includes a chair assembly 134, and more particularly an automobile car seat, including a seat section 136 and a back section 138 coupled to the seat section 136. The back section 138 may be angled relative to the seat section 136 to form the chair assembly 134. The chair assembly 134 may include an articulation mechanism 140 (shown in phantom) operably coupling the seat section 136 and the back section 138. The articulation mechanism 140 may be manually actuated, such as a lever, or electronic, such as a switch coupled to a controller (e.g., the controller 78 of the system 30). The articulating mechanism 140 receives an input of the person to selectively adjust the angle of the back section 138 relative to the seat section 136.

FIG. 6 shows a detailed view of the seat and back sections 136, 138 of the chair assembly 134. One or both of the seat and back sections 136, 138 may include several of the layers 46, 54, 60, 62 previously described and further discussed only briefly. It is contemplated one or both of the seat and back sections 136, 138 may include an electric heating layer 58' often included in automobile car seats (as an alternative to the fluid circulation layer 58 of the mattress 34). The flexible cover layer 46 defines the support surface 48 for supporting the person. The formable layer 54 is coupled to the flexible cover layer 46 and positioned opposite the support surface 48. The formable layer 54 includes the sealed bladder 64 in fluid communication with the vacuum source 70 for selectively providing the vacuum to the sealed bladder 64 to move the system 30 between the first configuration in the absence of the vacuum, and the second configuration in the presence of the vacuum. The particles 66 are disposed within the sealed bladder 64. The particles 66 are substantially movable relative to one another in the first configuration, and substantially immovable relative to one another in the second configuration. The particles 66 may be disposed within the medium 68.

The electric heating layer 58' is coupled to the formable layer 54 and positioned opposite the flexible cover layer 46. The electric heating layer 58' may include high resistance elements in electric communication with an electrical source (not shown) and a controller, whereby the flow of current through the elements causing heating within the layer 58. The fire barrier layer 60 may be coupled to the electric heating layer 58' and positioned opposite the formable layer 54. The cushioning layer 62 may be coupled to the fire barrier layer 60 and positioned opposite the electric heating layer 58'. The formable layer 54 is positioned intermediate the flexible cover layer 46 and the cushioning layer 62. It is to be understood that the construction of the layers 54, 58', 60, 62 internal to the flexible cover layer 46, as shown in FIG. 6, is one non-limiting arrangement. The layers may be alternatively arranged in any suitable manner, and the mattress 34 may include greater or fewer layers than those described.

As previously mentioned, aspects of the auto detect mode may be implemented in the positioning system 30 embodied in the chair assembly 134. With the support apparatus 32 such as the hospital bed, maintaining a clinically stable position of patient anatomy may be a primary objective. The positioning system 30 integrated with the chair assembly 134 such as the automobile car seat should provide comfort while not unduly encumbering movement of the person. The aspects of the auto detect mode will be described in the context of a driver of an automobile including the positioning system 30 integrated into the chair assembly 134. Before the driver is situated on the chair assembly 134, the system 30 is in the first configuration. In one example, when the load signals from the sensors 76 are indicative of an absence of forces applied to the flexible cover layer 46 (i.e., no person is supported on the support surface 48), the system 30 operates in the first configuration. As the driver is to be situated on the chair assembly 134, the formable layer 54 will lack rigidity and provide an expected cushioned feeling as he or she is seated. An upper surface of the seat section 136 may be provided with a curvature, and the weight of the driver situated on the seat section 136 with the system 30 in the first configuration may further contour the flexible cover layer 46, the formable layer 54, and other layers. The result may be a "bucket seat" as termed in the art. After the driver has been situated, the load signals from the sensors 76 are indicative of stable forces applied to the flexible cover layer 46. If the stable forces exceed the predetermined period of time, the controller 78 controls the vacuum source 70 to operate the system 30 in the second configuration. The formable layer 54 of one or both of the seat section 136 and the back section 138 becomes rigid and maintains the contour of the support surface 48. The bucket seat is effectively formed and contoured to the driver for comfort. For any number of reasons, the driver may move within the chair assembly 134, for example, to exit the vehicle. The person situated on the support surface 48 begins to move more than minimally, and the system 30 is designed to rapidly move from the second configuration to the first configuration to accommodate the movement. The controller 78 controls the vacuum source 70 to move the system 30 from the second configuration to the first configuration in response to the load signals from the sensors 76 indicating a change in the forces applied to the flexible cover layer 46.

Figure 7:
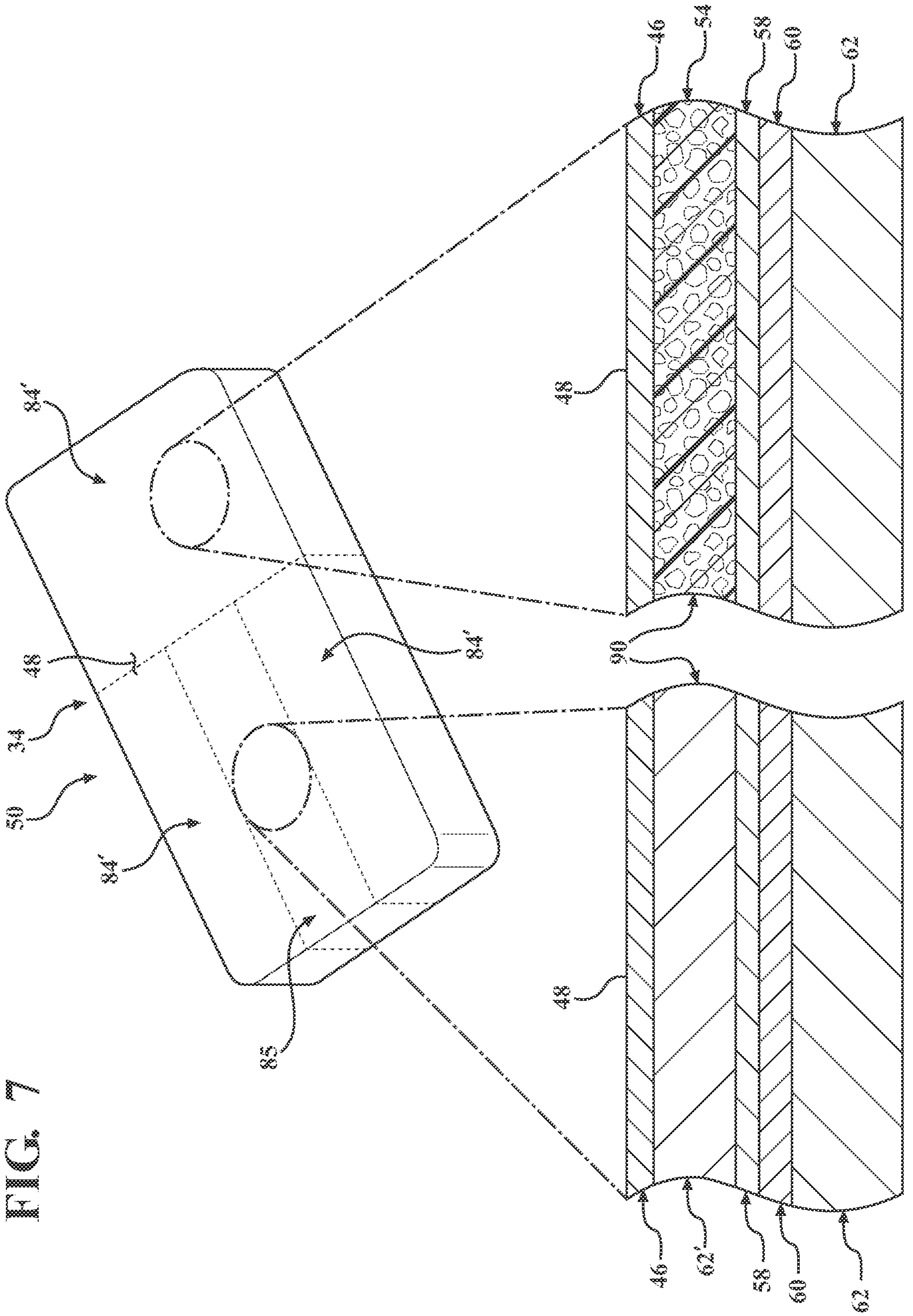
FIG. 7 is a perspective view of a mattress in accordance with another exemplary embodiment of the present disclosure with a detailed sectional view of layers of the mattress including a multifunctional layer.

Referring to FIG. 7, the positioning system 30 in accordance with another exemplary embodiment of the present disclosure is shown. In certain instances, providing the formable layer 54 extending beneath an entirety of the flexible cover layer 46 may not be necessary. In a previously described embodiment, the zones 84 of the system 30 may be independently moved between the first and second configurations such that the contour 49, 49' provided to the support surface 48 may be maintained in only select zones 84 (see FIG. 5). The embodiment illustrated in FIG. 7 includes a multifunctional layer 90 defined by formable zones 84' and cushioning zones 85 exclusive from the formable zones 84'. Only the formable zones 84' include the formable layer 54 with the sealed bladder 64 and particles 66 disposed therein. As a result, the controller 78 may operate the vacuum source 70 to provide the vacuum to the sealed bladder 64 within the formable zones 68', and the cushioning zones 85 exclusive from the formable zones 84' include a cushioning layer 62' providing cushioning and support for the comfort of the person.

The exemplary embodiment illustrated in FIG. 7 shows the support surface 48 defined by four zones—three formable zones 84' and one cushioning zone 85—the number and arrangement of the zones 84' and 85 is one non-limiting example. The cushioning zone 85 is positioned intermediate to two of the formable zones 84' to define an area of the support surface 48 on which the torso of the person is likely situated. The formable zones 84' define areas of the support surface 48 on which the appendages of the person are likely situated. In the present example, it may be considered relative more necessary to maintain the position of the appendages through the use of the positioning system 30, and it may be considered relative more necessary to provide supplemental cushioning and support to the torso (including the spine) of the person.

As shown in the detailed sectional views of FIG. 7, the positioning system 30 in each of the formable zones 84' and the cushioning zones 85 include the flexible covering layer 46 defining the support surface 48, the fluid circulation layer 58, the fire barrier layer 60, and the cushioning layer 62. The layers 46, 58, 60, 62 include structure and function the same as embodiments previously described. The layers 46, 58, 60, 62 may be integral and continuous between the zones 84', 85. In other words, each of the layers 46, 58, 60, 62 within the formable zone 84' may be integral and continuous with its counterpart layer 46, 58, 60, 62 within the cushioning zones 85. The layers 46, 58, 60, 62 are constructed to form the mattress 34 with which the multifunctional layer 90 of the positioning system 30 is integrated.

As shown in FIG. 7, the multifunctional layer 90 may be considered a combination of the formable layer 54 within the formable zones 84' and the cushioning layer 62' within the cushioning zones 85. The multifunctional layer 90 is defined by formable zones 84' each including the formable layer 54. Each of the formable zones 84' include the sealed bladder 64 in fluid communication with the vacuum source 70. The particles 66 disposed within the sealed bladder 64 are substantially movable relative to one another with the system 30 in the first configuration, and substantially immovable relative to one another with the system 30 in the second configuration. The contour 49, 49' provided to the support surface 48 by applying forces to the flexible cover layer 46 is maintained with the rigidity assumed by the formable layer 54 with the system 30 in the second configuration in manners previously described.

The multifunctional layer 90 is further defined by the cushioning zones 85 include the cushioning layer 62'. The cushioning layer 62' may be the same or different as the cushioning layer 62 previously described. For example, the cushioning layer 62' may be formed of foam, viscoelastic material, or a combination thereof. The cushioning layer 62' may be arranged within the cushioning zones 85 counterpart to the formable layer 54 within the formable zones 84'. In other words, the cushioning zones 85 do not include the formable layer 54. The cushioning layer 62' may be adjacent to the formable layer 54 to form a singular layer of the mattress 34.

Figure 8:
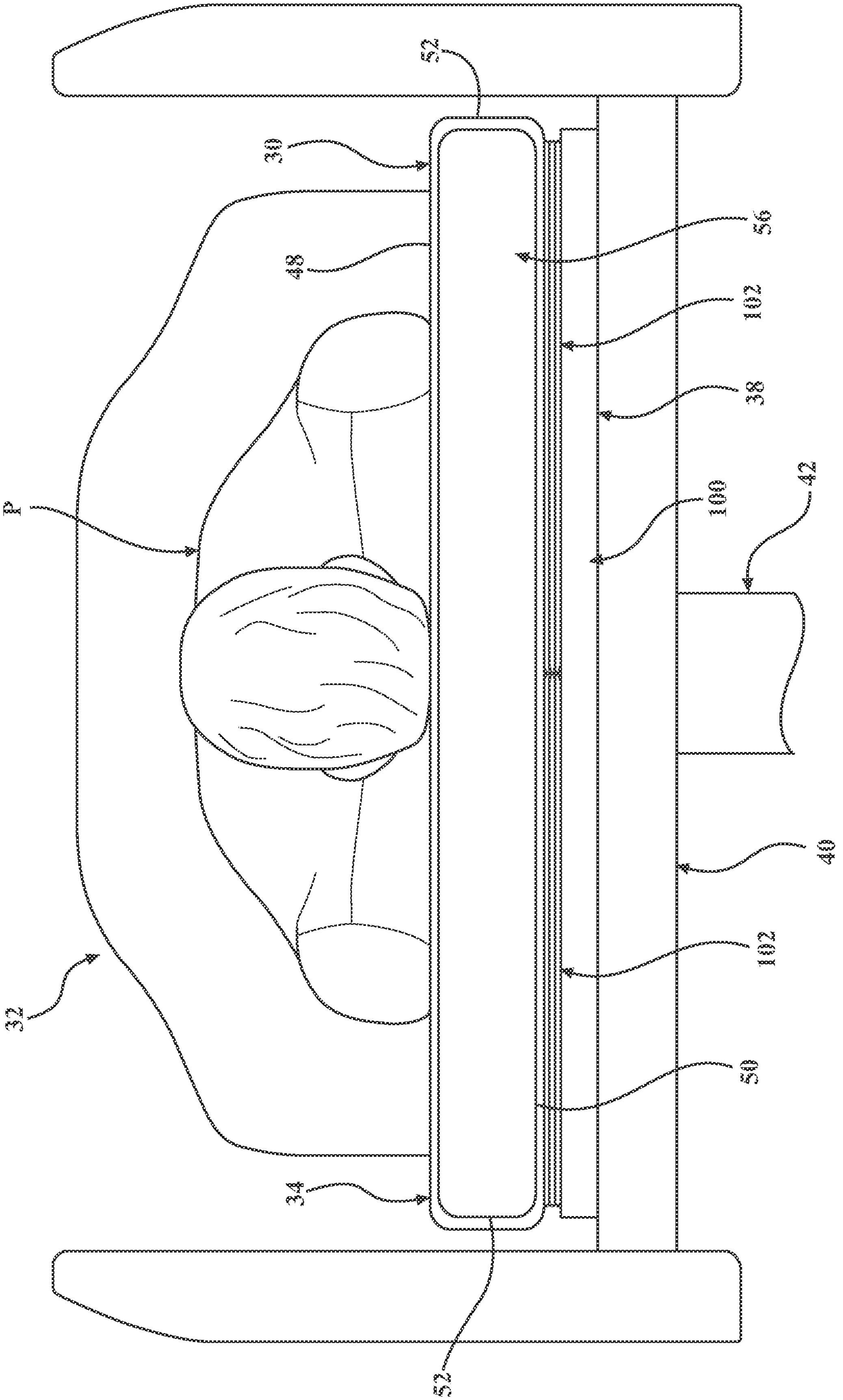
FIG. 8 is an elevation view of a portion of the support apparatus of FIG. 1 showing a patient turning system in the absence of movement therapy.
Figure 9:
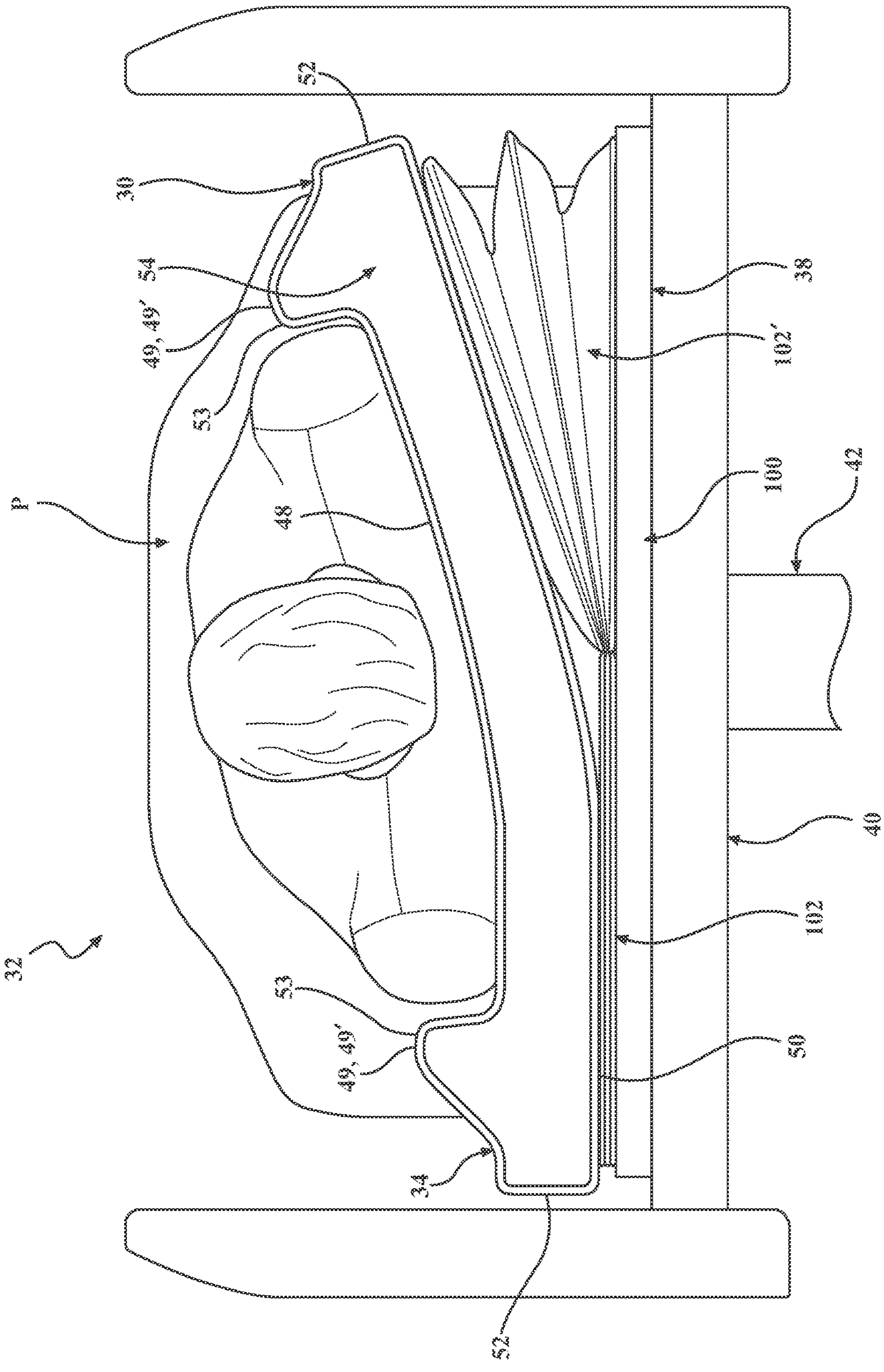
FIG. 9 is an elevation view of the portion of the patient support apparatus of FIG. 8 showing the patient turning system providing movement therapy to the person and with a contour to the support surface maintained with the positioning system in the second configuration.

As described throughout the present disclosure, the positioning system 30 facilitates maintaining the position of the person (e.g., the anatomy of the person) when the person is situated on the support surface 48. In one manner this is achieved through providing the lateral support to the person with the contour 49, 49' (see FIG. 3) with the system 30 in the second configuration. Maintaining the position of the person may be particularly desirable with a support apparatus designed to perform a patient turning operation or movement therapy. Referring to FIGS. 8 and 9, the support apparatus 32 of FIG. 1 is shown with the support apparatus 32 including a patient turning system 100. The patient turning system 100 includes inflatable bladders 102 for providing the movement therapy. The inflatable bladders 102 may be positioned external to the mattress 34 and below the lower surface 50 of the mattress 34. In other words, the inflatable bladders 102 are positioned intermediate the lower surface 50 of the mattress 34 and the support deck 38. The inflatable bladders 102 are in fluid communication with a fluid source (e.g., the medium source 72 of FIG. 4). The inflatable bladders 102 are selectively inflated with fluid from the fluid source in a manner to be described in order to move at least a portion of the mattress 34 away from the support deck 38 to provide the movement therapy. FIG. 8 shows the patient support apparatus 32 with the patient turning system 100 in what may be considered the absence of movement therapy with the support surface 48 of the mattress 34 being substantially horizontal with the person (P) situated thereon in the supine position as shown. An exemplary operation of the movement therapy is shown in FIG. 9 with one of the inflatable bladders 102' inflated. Inflation of the inflatable bladders 102 provides upward force to the mattress 34 sufficient to overcome the weight of the mattress 34 and the person supported thereon. A portion of the support surface 48 of the mattress 34 is moved away from the support deck 38 in response to inflation of the inflatable bladder 102'. For example, the support surface 48 proximate a right one of the sides 52 is moved away from the patient support deck 38 to a greater extent than the support surface 48 proximate the left one of the sides 52. The upward movement of the portion of the mattress 34 tilts, turns or otherwise moves the patient P in a corresponding manner.

The portion of the support surface 48 moved away from the patient support deck 38 may be oriented at an angle of 15, 30, 45, 60 or more degrees during the patient turning operation. Depending on the rigidity or flexibility of the mattress 34, the body habitus of the person, and other factors, orienting the support surface 48 at an angle may undesirably cause the person to slide, roll, or otherwise move laterally downward the angled support surface 48. The positioning system 30 may be configured to provide the lateral support to the person so as to decrease the likelihood the person will slide, roll, or otherwise move laterally downward the angled support surface 48.

With reference to FIG. 9, the mattress 34 is shown with the contour 49, 49' provided to the support surface 48. The contour 49, 49' is provided by forces from the weight of the person situated on the support surface 48, and may be further provided from the supplemental forces applied to the flexible cover layer 46 in manner previously described. The contour 49, 49' shown in FIG. 9 creates the localized peaks 53 adjacent to and generally contoured to the anatomy of the person such that the person is subsumed within the depression or cavity defined by the contour 49, 49' of the support surface 48. The vacuum source 70 is operated to move the system 30 from the first configuration to the second configuration in which the particles 66 contact one another and become substantially immovable relative to one another in the manner previously described. With the particles 66 contact with and substantially immovable relative to one another, rigidity is provided to the formable layer 54. The rigidity maintains the contour 49, 49' provided to the support surface 48. In effect, the contour 49, 49' of the support surface 48 provides the lateral support to the person to facilitate maintaining the clinically suitable position of the person such that, when the support surface 48 is angled 15, 30, 45, 60 or more degrees during the patient turning operation, the likelihood is reduced that the person will slide, roll, or otherwise move laterally downward the angled support surface 48.

In several of the exemplary embodiments previously described the layers 46, 54, 58, 60, 62 may be constructed so as to form the mattress 34 such that the positioning system 30 is integrated within the mattress 34. In another exemplary embodiment of the present disclosure, the positioning system 30 is integrated into a mattress cover 104 (see FIGS. 2 and 3) coupled to the mattress 34. In certain embodiments, the mattress cover 104 may be coupled to the mattress 34 so as to substantially encase the mattress 34. For example, the mattress cover 104 may include a fastening device 106 coupling sections of the mattress cover such that the mattress cover 104 is removably coupled to the mattress 34. FIGS. 2 and 3 shows the fastening device 106 including a zipper, and other suitable fastening devices may include snaps, clips, tethers, hook and eye connections, adhesive, and the like. In other exemplary embodiments, the mattress cover 104 is secured to the support surface 48 of the mattress 34 akin to a "mattress topper." In embodiments including the mattress cover 104, the mattress cover 104 includes the flexible cover layer 46 and the formable layer 54 previously described. The mattress cover 104 may also include one or more of the other layers 58, 60, 62 previously described. The mattress cover 104 provides for, among other advantages, the positioning system 30 to be retrofit onto a conventional mattress.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A system for supporting and positioning a person, the system comprising:

a mattress adapted to be supported on a support deck and comprising a top side and an opposing bottom side, a flexible cover layer having a support surface for the person, the support surface defining the top side of the mattress;

a formable layer coupled to and abutting the flexible cover layer and positioned vertically below the support surface, the formable layer including:

a sealed bladder adapted to be in fluid communication with a vacuum source for selectively providing a vacuum to the sealed bladder to move the system between a first configuration in the absence of the vacuum, and a second configuration in the presence of the vacuum, and particles disposed within the sealed bladder and adapted to be substantially movable relative to one another in the first configuration such that a contour is provided to the support surface by applying forces to the flexible cover layer to alter a shape of the formable layer, and substantially immovable relative to one another in the second configuration such that the particles contact one another to provide rigidity to the formable layer to maintain the contour provided to the support surface for maintaining a position of a portion of the body of the person along the contour;

a cushioning layer disposed within the mattress opposite the formable layer relative to flexible cover layer such that the formable layer is positioned intermediate the flexible cover layer and the cushioning layer;

a fluid circulation layer disposed vertically between the formable layer and the cushioning layer; and a controller coupled to the vacuum source and configured to control the vacuum source to move the system between the first and second configurations.

2. The system of claim 1, wherein the particles comprise substantially incompressible beads.

3. The system of claim 1, wherein the particles are at least partially formed from polystyrene.

4. The system of claim 1, further comprising a viscoelastic material disposed within the sealed bladder with the particles comprising beads disposed within the viscoelastic material.

5. The system of claim 1, further comprising a patient turning device comprising inflatable bladders positioned external to the mattress with the inflatable bladders adapted to be in fluid communication with a medium source and adapted to be selectively inflated with fluid from the medium source to move a portion of the mattress away from the support deck to provide movement therapy to the person supported on the support surface.

6. The system of claim 1, further comprising one or more sensors responsive to forces on the support surface and adapted to generate load signals; and wherein the controller is coupled to the one or more sensor and is configured to control the vacuum source to operate the system in the second configuration when the load signals from the sensors are indicative of stable forces applied to the flexible cover layer.

7. The system of claim 6, wherein the controller comprises a timer function with the controller configured to control the vacuum source to operate the system in the second configuration when the load signals from the sensors are indicative of stable forces applied to the flexible cover layer for a predetermined period.

8. The system of claim 6, wherein the sensors are coupled to one of the flexible cover layer and the formable layer.

9. The system of claim 6, wherein the controller is configured to control the vacuum source to operate the system in the first configuration when the load signals from the sensors are indicative of an absence of the forces applied to the flexible cover layer.

10. The system of claim 6, wherein the controller is further configured to control the vacuum source to move the system from the second configuration to the first configuration in response to the load signals from the sensors indicating a change in the forces applied to the flexible cover layer.

11. The system of claim 6, wherein the formable layer is defined by a plurality of zones with at least two of the zones adapted to be independently moved between the first configuration and the second configuration.

12. The system of claim 11, wherein the zones each comprise a sealed compartment within the sealed bladder with the sealed compartments in fluid communication with the vacuum source, and valves each in fluid communication with one of the zones and coupled to the controller.

13. The system of claim 12, wherein the one or more sensors comprise a plurality of sensors each associated with one of the zones and adapted to generate the load signals based on forces sensed on the support surface within each of the zones, wherein the controller is configured to control the vacuum source and the valves to selectively move one or more of the sealed compartments between the configuration and the second configuration.

14. The system of claim 1, further comprising an input device coupled to the controller and adapted to receive an input from the person or a secondary user with the controller configured to control the vacuum source in response to the input device receiving the input.

15. The system of claim 1, wherein the particles are adapted to be substantially movable relative to one another in response to the forces applied to the support surface in the first configuration, and substantially immovable relative to one another in the second configuration.

16. A system for supporting and positioning a person, the system comprising:

a mattress adapted to be supported on a support deck and comprising a top side and an opposing bottom side, a flexible cover layer having a support surface for the person, the support surface defining the top side of the mattress; and a multifunctional layer coupled to and abutting the flexible cover layer and positioned vertically below the support surface, the multifunctional layer including:

a plurality of formable zones each comprising:

a sealed bladder in fluid communication with a vacuum source for selectively providing a vacuum to the sealed bladder to move the system between a first configuration in the absence of the vacuum, and a second configuration in the presence of the vacuum, and particles disposed within the sealed bladder and adapted to be substantially movable relative to one another in the first configuration such that a contour is provided to the support surface by applying forces to the flexible cover layer, and substantially immovable relative to one another in the second configuration such that the particles contact one another to provide rigidity to maintain the contour provided to the support surface for maintaining a position of a portion of the body of the person along the contour; and a plurality of cushioning zones exclusive from the formable zones and comprising cushioning;

wherein the plurality of cushioning zones are spaced longitudinally from the plurality of formable zones; and wherein the plurality of cushioning zones are aligned vertically with the plurality of formable zones.

17. The system of claim 16, further comprising a cushioning layer disposed within the mattress adjacent to the bottom side; and wherein the multifunctional layer is disposed vertically below the support surface and vertically above the cushioning layer.

18. The system of claim 17, further comprising a fluid circulation layer disposed vertically between the multifunctional layer and the cushioning layer.

19. A system for supporting and positioning a person, the system comprising:

a mattress adapted to be supported on a support deck and comprising a top side and an opposing bottom side, a flexible cover layer having a support surface for the person, the support surface defining the top side of the mattress;

a cushioning layer disposed within the mattress adjacent to the bottom side; and a multifunctional layer coupled to and abutting the flexible cover layer and positioned vertically below the support surface and vertically above the cushioning layer, the multifunctional layer including:

a plurality of formable zones each comprising:

a sealed bladder in fluid communication with a vacuum source for selectively providing a vacuum to the sealed bladder to move the system between a first configuration in the absence of the vacuum, and a second configuration in the presence of the vacuum, and particles disposed within the sealed bladder and adapted to be substantially movable relative to one another in the first configuration such that a contour is provided to the support surface by applying forces to the flexible cover layer, and substantially immovable relative to one another in the second configuration such that the particles contact one another to provide rigidity to maintain the contour provided to the support surface for maintaining a position of a portion of the body of the person along the contour; and a plurality of cushioning zones exclusive from the formable zones and comprising cushioning; and a fluid circulation layer disposed vertically between the multifunctional layer and the cushioning layer.

* * * * *